US012481353B1

(12) United States Patent
Schmidlin

(10) Patent No.: US 12,481,353 B1
(45) Date of Patent: Nov. 25, 2025

(54) DETECTING ONSET OF MOTION SICKNESS IN VIRTUAL REALITY (VR)

(71) Applicant: Sony Interactive Entertainment LLC, San Mateo, CA (US)

(72) Inventor: Elizabeth Schmidlin, San Mateo, CA (US)

(73) Assignee: Sony Interactive Entertainment LLC ( * ) Notice: Subject to any disclaimer, the term of this patent is extended or adjusted under 35 U.S.C. 154(b) by 0 days.

(21) Appl. No.: 18/671,789

(22) Filed: May 22, 2024

(51) Int. Cl.
G02B 27/01 (2006.01)
G06F 3/01 (2006.01)
G06F 3/04815 (2022.01)
G06F 3/04847 (2022.01)
G06T 5/10 (2006.01)

(52) U.S. Cl.
CPC ........... *G06F 3/012* (2013.01); *G02B 27/017* (2013.01); *G06F 3/04815* (2013.01); *G06F 3/04847* (2013.01); *G06T 5/10* (2013.01)

(58) Field of Classification Search
None
See application file for complete search history.

(56) References Cited

U.S. PATENT DOCUMENTS

| 11,493,990 | B2* | 11/2022 | Kakizawa | A63F 13/212 |
| 2015/0265161 | A1* | 9/2015 | Hernandez | A61B 5/0816 |
| | | | | 600/483 |
| 2016/0262608 | A1 | 9/2016 | Krueger | |
| 2018/0296921 | A1 | 10/2018 | Watson | |
| 2019/0171280 | A1 | 6/2019 | Son et al. | |
| 2019/0180448 | A1 | 6/2019 | Ro et al. | |
| 2020/0124845 | A1* | 4/2020 | Smith | G09G 5/363 |

FOREIGN PATENT DOCUMENTS

KR 20230158225 A 11/2023

OTHER PUBLICATIONS

PCT/US2025/030230, "International Search Report and Written Opinion", Aug. 29, 2025, 11 pages.

* cited by examiner

*Primary Examiner* — Parul H Gupta
(74) *Attorney, Agent, or Firm* — Kilpatrick Townsend & Stockton LLP

(57) ABSTRACT

Detecting Onset of Motion Sickness in Virtual Reality (VR) Signals from a motion sensor on a head-mounted device (HMD) used by a player of a computer game are analyzed to determine whether motion of the player such as sway may resemble a precursor motion pattern to motion sickness, so that the player may be advised accordingly before the symptoms of motion sickness manifest themselves.

20 Claims, 9 Drawing Sheets

DETECTING ONSET OF MOTION SICKNESS IN VIRTUAL REALITY (VR)

FIELD

The present application relates generally to detecting the onset of motion sickness in virtual reality (VR).

BACKGROUND

Motion sickness is characterized by the onset of dizziness, nausea, clamminess, feeling lightheaded or even headachy. While more commonly associated with the real world it can impact anybody, including computer gamers, viewing computer games onscreen or using head-mounted displays (HMD). Why do people get motion sick?Sensory Conflict theory can be leveraged to investigate an event after it occurs, but does little to help prevent motion sickness, as not every mismatch of expectations or sensations results in sickness, and there is not a clear definition of what needs to be mismatched or to what degree to trigger motion sickness. Accordingly, gamers can only react after motion sickness sets in, when it's too late.

SUMMARY

Present principles, in recognizing the above technical challenges, understand that changes in postural stability may proceed motion sickness across a wide variety of context, and that this can establish a window in which motion sickness might be detected before symptoms manifest.

Accordingly, a method includes receiving motion sensor signals of a player of a computer simulation, and based at least in part on the images, presenting an advisory respecting motion sickness. The motion sensor signals may be generated by at least one motion sensor on a head-mounted display (HMD) worn by the player.

In some examples the advisory can be presented on at least one video display. In other examples the advisory is presented on at least one speaker.

In example implementations the method can include determining motion over time based at least in part on the signals from the motion sensor on the HMD, in which the advisory is presented responsive to the motion over time. More specifically, the method can include deriving at least one Fourier transform of the motion over time, and the advisory is presented responsive to the Fourier transform.

In some embodiments the method can include using at least one machine learning (ML) model to determine whether to present the advisory.

In example embodiments the method may includes, after presenting the advisory, continuing to monitor player motion over time, and based at least in part on continued monitoring of player motion over time, altering at least one display setting. The display setting may be, e.g., field of view (FOV) or refresh rate. The display setting may be altered based on manual input, for example using a slider element of a UI, or it may be altered automatically.

In another aspect, a processor system is configured to process signals from at least one motion sensor configured to sense motion of a player of a computer simulation, and based at least in part on the process, present at least one indication of motion sickness.

In another aspect, a device includes at least one computer memory that is not a transitory signal and that in turn includes instructions executable by at least one processor system to receive signals from at least one motion sensor, e.g., on a HMD, representing motion of a player of a computer game wearing the HMD, the images representing motion of the player, and responsive to the motion of the player represented by the signals, present an indication perceptible by the player that motion sickness may ensue.

The details of the present application, both as to its structure and operation, can be best understood in reference to the accompanying drawings, in which like reference numerals refer to like parts.h:

BRIEF DESCRIPTION OF THE DRAWINGS

FIG. 3 illustrates example logic in example flow chart format for using camera images of a player over time to determine risk of motion sickness before symptoms set in;

FIG. 13 illustrates example logic in example flow chart format for using motion sensor signals of a player over time to determine risk of motion sickness before symptoms set in;

DETAILED DESCRIPTION

Figure 1:
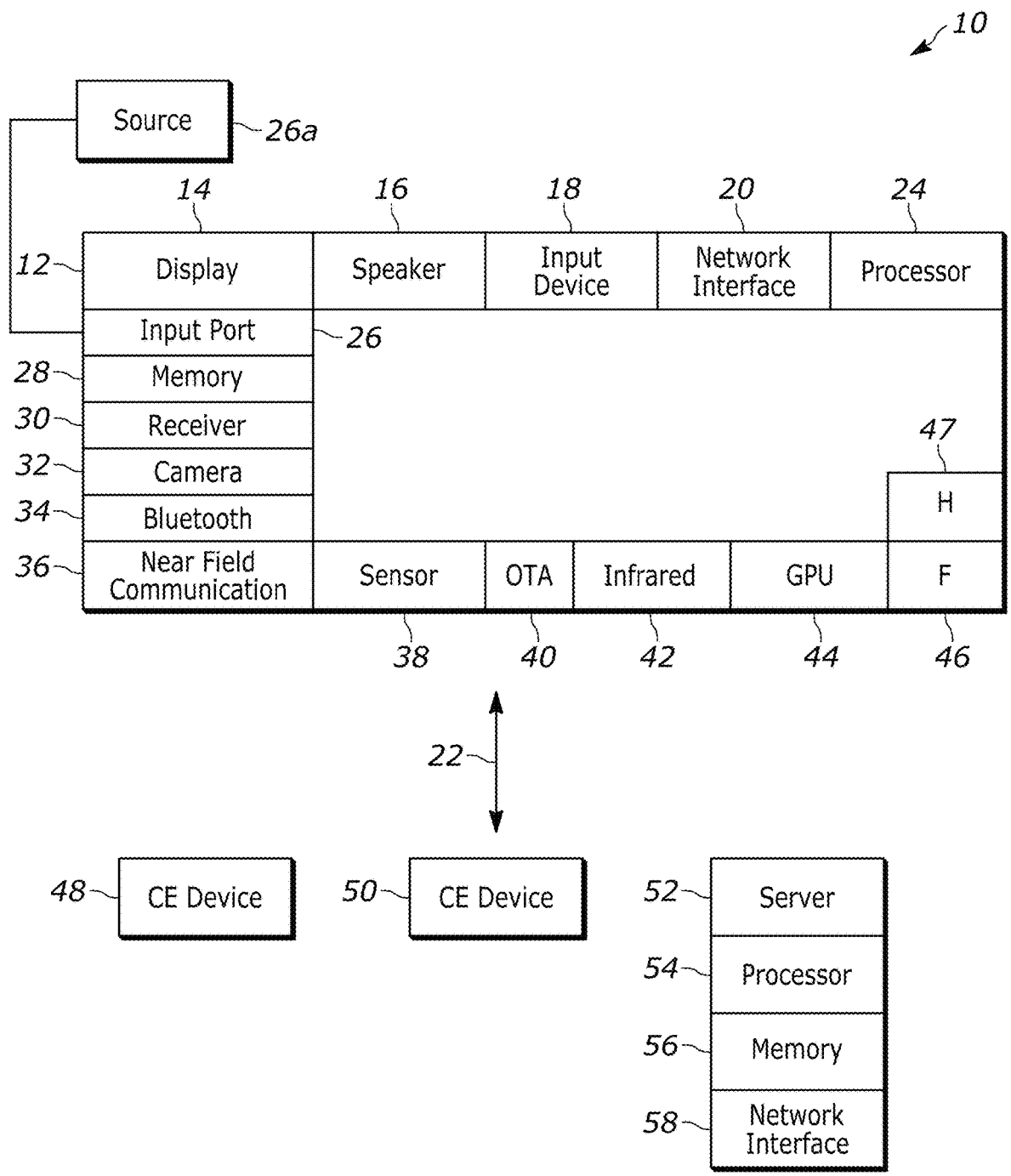
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

Figure 2:
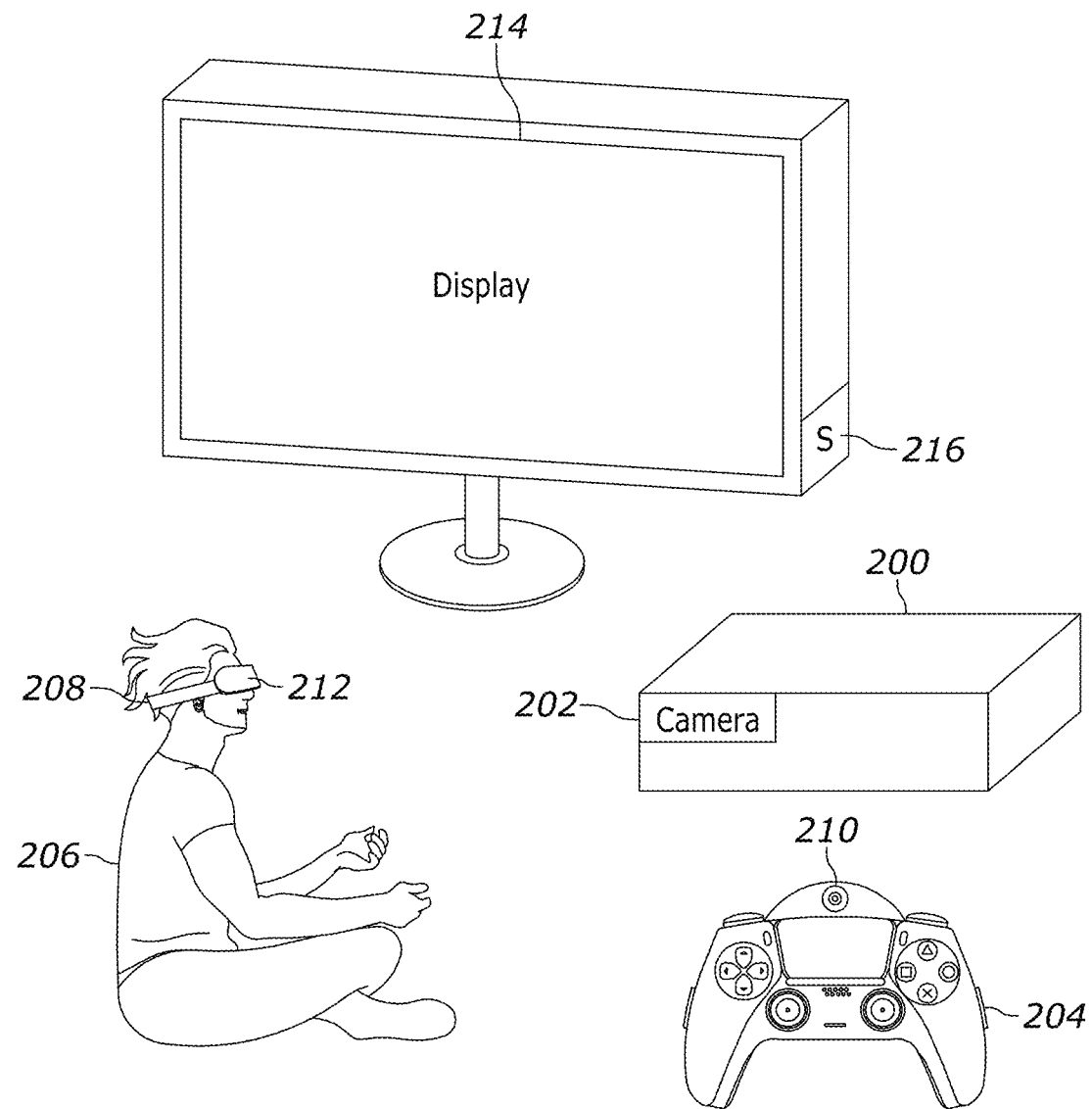
FIG. 2 illustrates an example computer simulation, in this case an example computer game system, consistent with present principles.

Refer now to FIG. 2. A computer simulation console 200 such as a computer game console executes computer simulations such as computer games. Among other components, the console 200 may include one or more cameras 202 such as IR and/or RGB cameras. The computer game may be controlled according to signals from a computer game controller 204 wielded by a player 206 who may wear a HMD 208 and whose movements may be captured over time by the camera 202. The controller 204 may include one or more RGB and/or IR cameras 210 and the HMD likewise may include one or more RGB and/or IR cameras 212, and the player's motions may be captured by any one or more of the cameras 202, 210, 212 shown in FIG. 2.

The computer game may be presented on a display 214 that may include one or more speakers 216.

Figure 3:
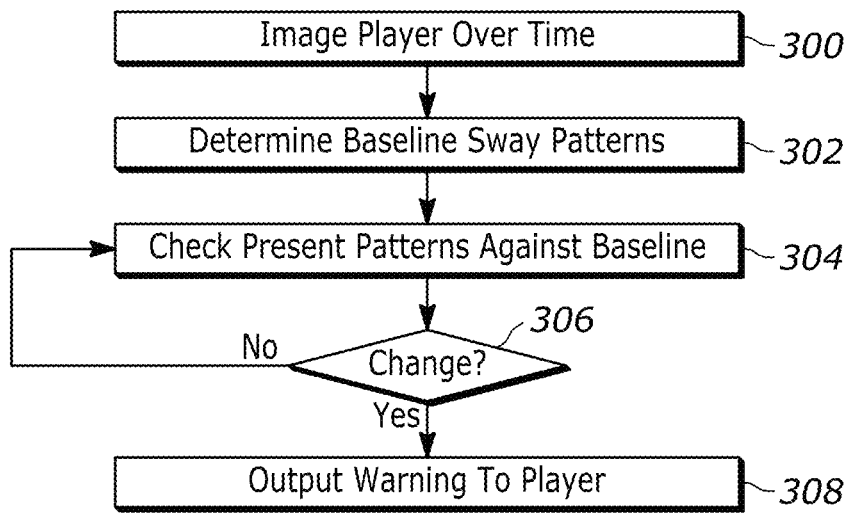

Turn now to FIG. 3. Commencing at state 300, the player 206 is imaged over time, e.g., by the camera 202 on the console 200. The player may be imaged for only a few hundred milliseconds, or for several seconds, or for many minutes. State 302 indicates that initially, the images are processed to determine baseline movement patterns, referred to herein at times as sway patterns, of the player 206 over time. For example, machine vision may be used to convert the images to a graphical representation of the motion over time in two or three dimensions of the center of gravity of the player, as may be approximated by images of the player's stomach. In addition or alternatively, machine vision may be used to convert the images to a graphical representation of the motion over time in two or three dimensions of the head of the player 206. In addition or alternatively, machine vision may be used to convert the images to a graphical representation of the motion over time in two or three dimensions of the eyes of the player. In addition or alternatively, machine vision may be used to convert the images to a graphical representation of the motion over time in two or three dimensions of the arms and/or legs of the player 206.

In some embodiments the spatial representations of motion over time may be converted to the frequency domain by applying a Fourier transform to the representations of motion. After establishing the baseline, either the spatial domain representations of motion over time and/or or frequency domain transform of subsequent motion as indicated by subsequent images of the player may be checked at state 304 against the baseline from state 302. State 306 indicates that it is determined whether the person's present motion relative to the baseline may be a precursor to motion sickness. If so, a warning may be output to the player at state 308 on the display 214 and/or speakers 216, as well as other actions discussed further below. In this way, the player may be able to take corrective action such as by removing the HMD 212 or stopping play of the game before motion sickness symptoms become manifest. A negative test at state 306 causes continued monitoring of the present motion of player at state 304.

Figure 4:
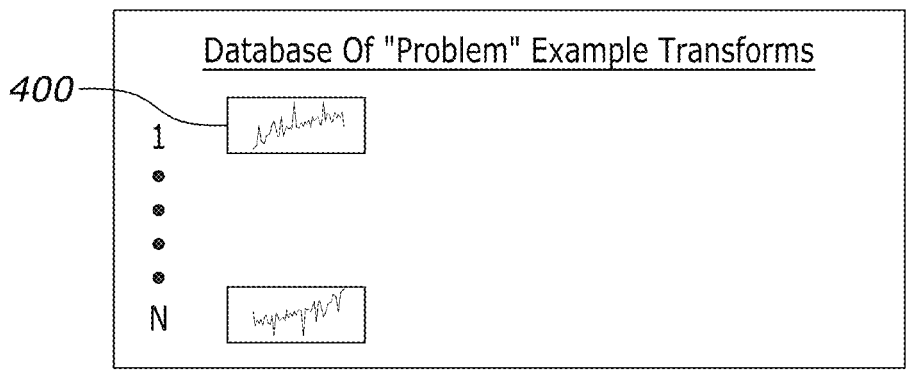
FIG. 4 illustrates a database of example Fourier transforms of image-derived sway that are possibly precursors of motion sickness-inducing sway.

FIG. 4 illustrates a first example of how to make the determination at state 306 in FIG. 3. A database 400 of example Fourier transforms representing motion over time that have been determined to produce motion sickness may be accessed and the Fourier transform from state 304 in FIG. 4 compared to the examples in the database. The comparison may use, in one example, a comparison function, or may employ a simple comparison of peaks and rates of change, and if the Fourier transform from state 304 (or equivalently the spatial domain representation from state 302 in FIG. 3) match within a predefined threshold one of the examples in the database, the logic can return a warning or advisory for presentations at state 308 in FIG. 3.

Figure 5:
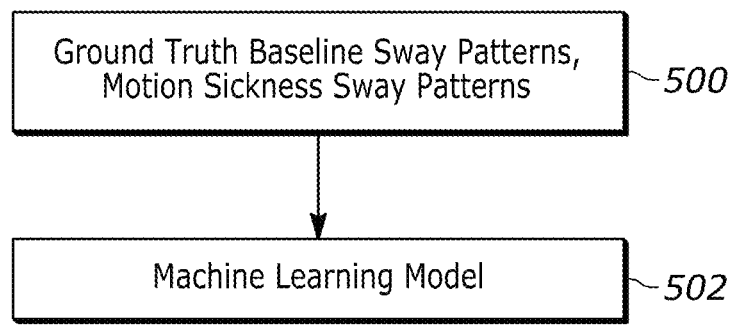
FIG. 5 illustrates training of a machine learning (ML) model to detect sway pattern precursors of motion sickness.
Figure 6:
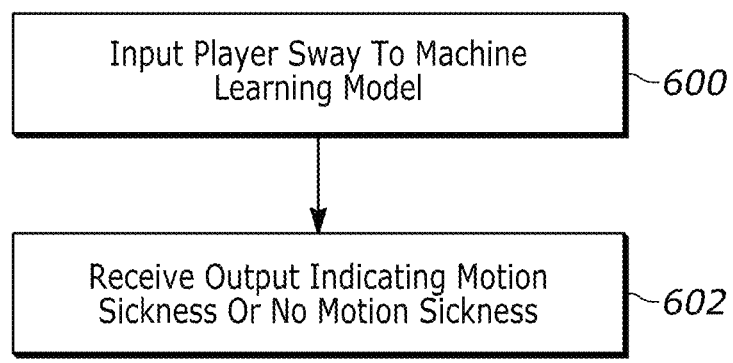
FIG. 6 illustrates example logic in example flow chart format for using the ML model of FIG. 5 to output indication of whether image-derived sway patterns of the player indicate precursor motion to motion sickness.

FIGS. 5 and 6 illustrate a second example of how to make the determination at state 306 in FIG. 3. Commencing at state 500 in FIG. 5, ground truth player sway patterns and motion sickness sway patterns may be input to one or more machine learning (ML) models 502 to train the model. In one example, the ground truth may be composed of videos of people not wearing HMDs while moving as their baseline motions plus videos of the same people wearing HMDs while moving and reporting symptoms of motion sickness. Note that the ground truth may be converted to spatial domain or frequency domain representations prior to being input to the ML model and any one or more of the various representations used to train a ML model, in some case to train respective ML models.

Then, at state 600 in FIG. 6 the player sway motion data from FIG. 3 (images and/or graphical spatial representation of motion and/or frequency domain representation) is input to the ML model(s) 502. Proceeding to state 602, output from the ML model(s) is received indicating whether the input motion representations indicate possible onset of motion sickness.

Figure 7:
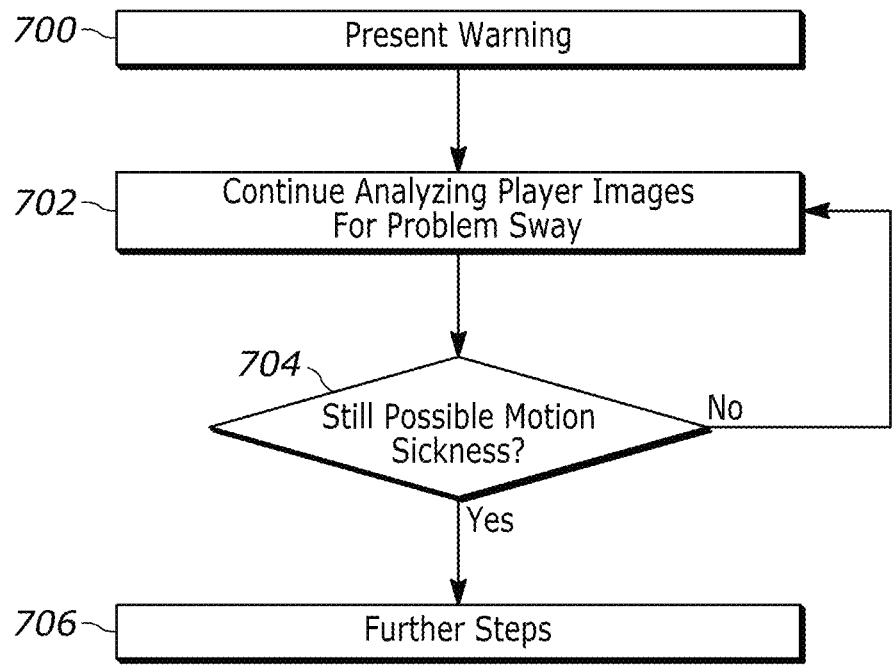
FIG. 7 illustrates example logic in example flow chart format for further steps after warning a player of the possible onset of motion sickness.

FIG. 7 illustrates additional details. Commencing at state 700, the warning/advisory from FIG. 3 may be visually or audibly presented to the player. State 702 indicates that after presenting the warning/advisory, the player may continue to be imaged for continuing monitoring of problem sway that might lead to motion sickness. If the continued image-based information is determined to be a possible precursor to motion sickness at state 704, further steps (discussed further below) may be executed at state 706.

Figure 8:
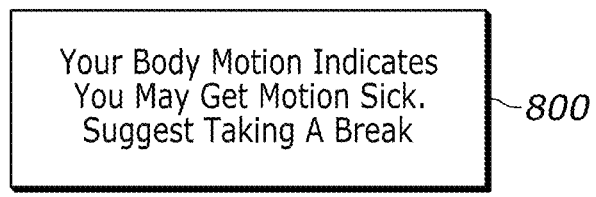
FIG. 8 illustrates an example screen shot of an example advisory to a player of the possible onset of motion sickness, it being understood that the warning may be presented audibly in addition or alternatively.

FIG. 8 illustrates a non-limiting example of a warning/advisory that may be presented on any display and/or speaker at state 308 in FIG. 3/state 700 in FIG. 7. Text may advise that the player's body motion may precipitate motion sickness, and that the player might consider taking a break from game play to alleviate the onset of symptoms.

Figure 9:
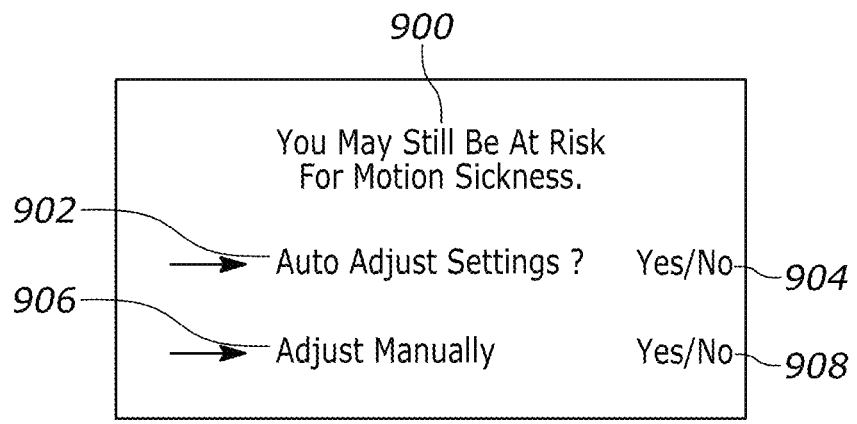
FIG. 9 illustrates an example screen shot of a user interface (UI) allowing a player to select to adjust certain display settings automatically or manually to reduce the risk of motion sickness, it being understood that the UI may be presented audibly in addition or alternatively.

FIG. 9 illustrates a first example of a further step that may be taken at state 706 in FIG. 7. A warning/advisory 900 may be presented on any display and/or speaker herein that the player's continued motion may precipitate motion sickness, and a query 902 can be presented whether the player would like certain display settings to be automatically adjusted to reduce the risk of motion sickness. Selectors 904 may be selected to input the player's response.

Similarly, a query 906 can be presented whether the player would like to manually adjust certain display settings to reduce the risk of motion sickness. Selectors 908 may be selected to input the player's response.

Figure 10:
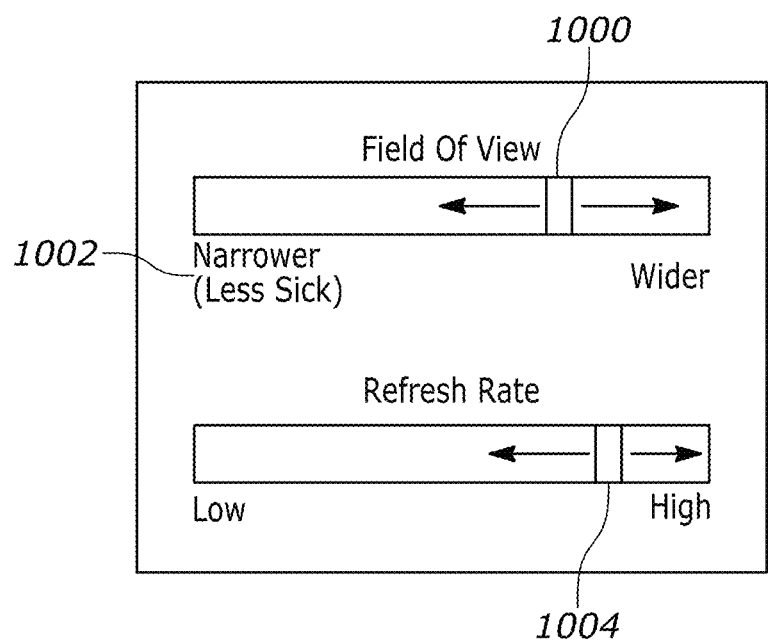
FIG. 10 illustrates an example screen shot of a UI for allowing a player to manually tune example display settings to reduce the risk of motion sickness, it being understood that the UI may be presented audibly in addition or alternatively.

FIG. 10 illustrates a UI that may be presented if the player selects to manually adjust display settings from the UI of FIG. 9. A slider element 1000 may be presented with an operator that can be slid left and right by the player (using a touch screen or other input means) to make the field of view (FOV) used to presented the computer game wider or narrower. An advisory 1002 may be used to indicate which way to move the slider element operator to reduce the risk of motion sickness.

Similarly, a slider element 1004 may be presented with an operator that can be slid left and right by the player (using a touch screen or other input means) to make the refresh rate used to presented the computer game wider or narrower. An advisory may be used to indicate which way to move the slider element operator to reduce the risk of motion sickness. Other display settings may be adjusted consistent with present principles, such as, for example, eliminating rapid changing from indoor to outdoor settings.

Figure 11:
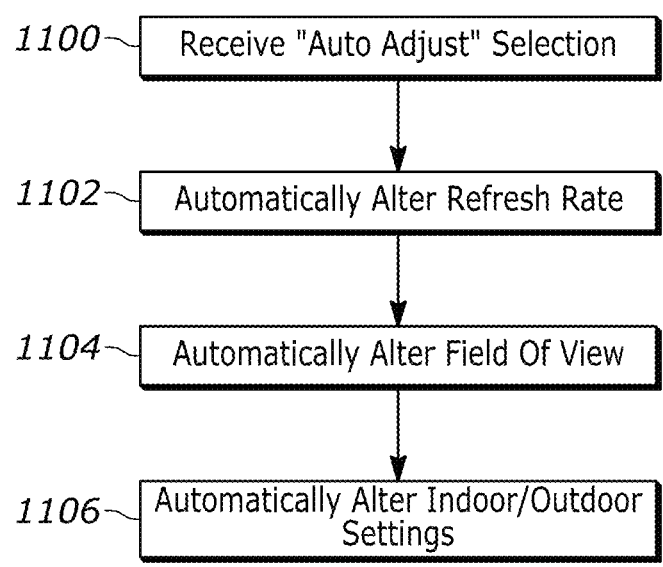
FIG. 11 illustrates example logic in example flow chart format for automatically adjusting one or more settings to reduce the risk of motion sickness.

FIG. 11 illustrates logic that may be employed responsive to the player selecting automatic adjustment of display settings from FIG. 9. Commencing at state 1100, the auto adjust selection is received. Moving to state 1102, the refresh rate may be automatically adjusted as appropriate (e.g., increasing the refresh rate). Also or alternatively, at state 1104 the FOV may be automatically adjusted (e.g., a wider FOV may present less risk of motion sickness than a narrower FOV). Also or alternatively, at state 1106 indoor/outdoor settings may be automatically altered, e.g., to prevent a sudden change from one to the other.

Figure 12:
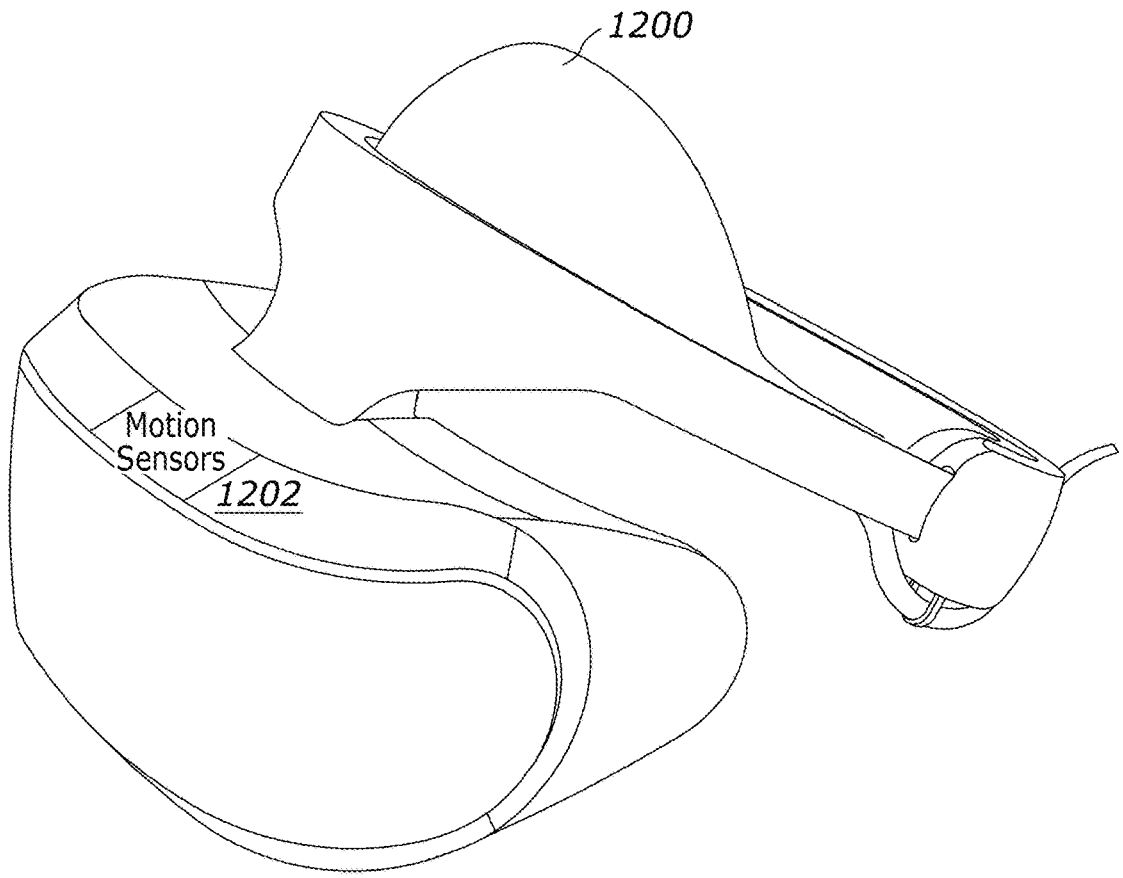
FIG. 12 illustrates an example HMD consistent with present principles.

FIG. 12 illustrates a HMD 1200 with one or more motion sensors 1202 such as any motion sensor described herein built into the HMD. As understood herein, in addition to or in lieu of image-based precursor indication of motion sickness, built-in gyroscopes, accelerometers, IMUs, or other motion sensor in a virtual reality (VR) or other extended reality (XR) headset such as a HMD may be used to accurately track a player's postural sway and detect when that pattern changes and provide an alert that the player may be at risk of getting motion sick. Note that the logic of FIG. 3 may be employed with a motion sensor implementation, replacing sensed sway patterns via imaging with sensed sway patterns via motion sensor signals.

Figure 13:
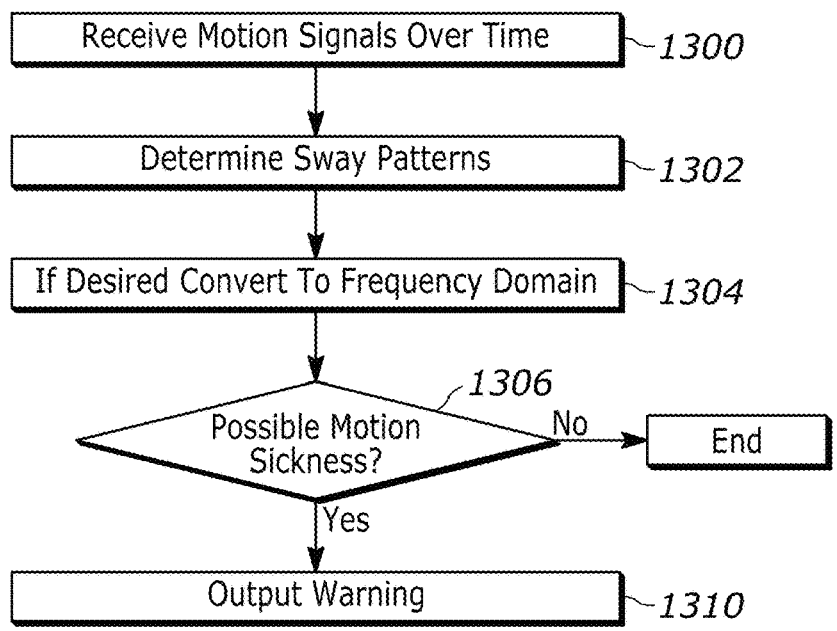

FIG. 13 illustrates further techniques. Commencing at state 1300, signals from the motion sensor 1202 are received. Proceeding to state 1302, spatial domain sway patterns are determined from the motion signals. If desired, at state 1304 the spatial domain patterns may be converted to the frequency domain using a Fourier transform. If it is determined at state 1306 that the motion signals from state 1300 and/or spatial domain representations from state 1302 and/or frequency domain representations from state 1304 indicate possible motion sickness, a warning/advisory is presented at state 1310 consistent with principles above.

Note that the logic of FIG. 13 may be employed with a camera image implementation, replacing sensed sway patterns via motion sensor signals with sensed sway patterns via imaging from a camera.

As was the case with image-based motion sickness detection, the determination at state 1306 in FIG. 13 may be made by comparing the input motion signal-based information to a library of waveforms known to cause motion sickness. Or, FIGS. 14 and 15 may be used to employ ML for this purpose as follows.

Figure 14:
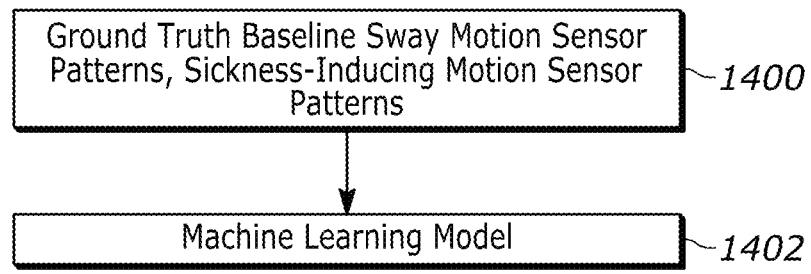
FIG. 14 illustrates training of a ML model to detect precursors of motion sickness based on signals derived from one or more motion sensors.

Commencing at state 1400 in FIG. 14, ground truth player sway patterns and motion sickness sway patterns as derived from motion sensor signals may be input to one or more machine learning (ML) models 1402 to train the model. In one example, the ground truth may be composed of motion sensor signals generated by people not wearing HMDs (but wearing a motion sensor, e.g., on a headband) while moving as their baseline motions plus motion sensor signals of the same people wearing HMDs while moving and reporting symptoms of motion sickness. Note that the ground truth may be converted to spatial domain or frequency domain representations prior to being input to the ML model and any one or more of the various representations used to train a ML model, in some case to train respective ML models.

Figure 15:
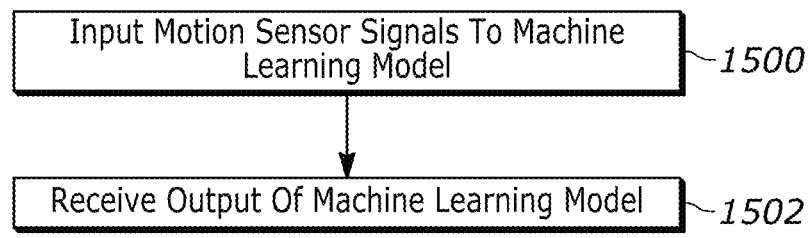
FIG. 15 illustrates example logic in example flow chart format for using the ML model of FIG. 14 to output indication of whether motion sensor signal-derived indications of player motion indicate precursor motion to motion sickness.

Then, at state 1500 in FIG. 15 the player sway motion data from FIG. 13 (motion sensor signals and/or graphical spatial representation of motion sensor signals and/or frequency domain representation) is input to the ML model(s) 1402. Proceeding to state 1502, output from the ML model(s) is received indicating whether the input motion representations indicate possible onset of motion sickness.

While the particular embodiments are herein shown and described in detail, it is to be understood that the subject matter which is encompassed by the present invention is limited only by the claims.

What is claimed is:
1. A method comprising:
determining, based on a first image generated by a camera, baseline movement patterns for a computer simulation;
receiving a second image generated by the camera, the second image showing a head-mounted display (HMD) worn by a player of the computer simulation;
determining a potential for motion sickness based on comparing the second image and the baseline movement patterns; and
presenting an advisory associated with the potential for motion sickness.
2. The method of claim 1, wherein the advisory is presented on at least one video display.
3. The method of claim 1, wherein the advisory is presented on at least one speaker.
4. The method of claim 1, comprising:
determining motion over time based at least in part on comparing the second image and the baseline movement patterns, the advisory being presented responsive to the motion over time.
5. The method of claim 4, comprising:
deriving at least one Fourier transform of the motion over time, the advisory being presented responsive to the Fourier transform.
6. The method of claim 1, comprising using at least one machine learning (ML) model to determine whether to present the advisory.
7. The method of claim 1, comprising:
after presenting the advisory, continuing to monitor player motion over time; and
based at least in part on continued monitoring of player motion over time, altering at least one display setting.
8. The method of claim 7, wherein the at least one display setting comprises field of view (FOV).
9. The method of claim 7, wherein the at least one display setting comprises refresh rate.
10. The method of claim 7, comprising receiving manual input of altering the at least one display setting.
11. The method of claim 10, wherein the manual input is entered using a slider element of a UI.
12. The method of claim 7, comprising automatically altering the at least one display setting.
13. A processor system configured to:
process a first image generated by a camera to determine baseline movement patterns for a computer simulation;
process a second image generated by the camera, the second image showing a head-mounted display (HMD) display worn by a player of the computer simulation;
determine a potential for motion sickness based on comparing the second image and the baseline movement patterns; and
present at least one advisory associated with the potential for motion sickness.
14. The processor system of claim 13, wherein the at least one advisory is presented on at least one of at least one video display and at least one speaker.
15. The processor system of claim 13, wherein the processor system is configured to:

derive at least one Fourier transform of motion over time based on comparing the second image and the baseline movement patterns, the at least one advisory being presented responsive to the Fourier transform.

16. The processor system of claim 13, wherein the processor system is configured to:
use at least one machine learning (ML) model to determine whether to present the at least one advisory.

17. The processor system of claim 13, wherein the processor system is configured to:
after presenting the at least one advisory, continue to monitor player motion over time; and
based at least in part on continued monitoring of player motion over time, alter at least one display setting.

18. The processor system of claim 13, wherein the display setting comprises field of view (FOV) and/or refresh rate.

19. A device comprising:
at least one computer memory that is not a transitory signal and that includes instructions executable by at least one processor system to:
determine, based on a first image generated by a camera, baseline movement patterns for a computer simulation;
receive a second image generated by the camera, the second image showing a head-mounted display (HMD) worn by a player of the computer simulation;
determine a potential for motion sickness based on comparing the second image and the baseline movement patterns; and
present an advisory associated with the potential for motion sickness.

20. The device of claim 19, wherein the camera is on at least one head-mounted display (HMD), and instructions are executable to:
after presenting the advisory, continue to monitor player motion over time; and
based at least in part on continued monitoring of player motion over time, alter at least one display setting.

* * * * *